United States Patent
Sadovyi et al.

(10) Patent No.: US 11,089,055 B1
(45) Date of Patent: Aug. 10, 2021

(54) METHOD FOR DETECTING A WEB SKIMMER ON A "PAYMENT PAGE"

(71) Applicant: Clario Tech LTD, London (GB)

(72) Inventors: Oleksii Sadovyi, Kyiv (UA); Vitaliy Moshkin, Kherson Region (UA); Anna Heryk, Kyiv Region (UA); Andrii Shalaienko, Kyivskyi Region (UA); Maksym Matveiev, Kyiv (UA); Volodymyr Shelest, Kyiv (UA)

(73) Assignee: Clario Tech LTD, London (GB)

( * ) Notice: Subject to any disclaimer, the term of this patent is extended or adjusted under 35 U.S.C. 154(b) by 0 days.

(21) Appl. No.: 17/121,172

(22) Filed: Dec. 14, 2020

(30) Foreign Application Priority Data

Aug. 18, 2020 (UA) .............................. a202005348

(51) Int. Cl.
*H04L 29/06* (2006.01)
*G06F 16/951* (2019.01)
*G06Q 20/08* (2012.01)
*G06F 40/284* (2020.01)

(52) U.S. Cl.
CPC ........ *H04L 63/1483* (2013.01); *G06F 16/951* (2019.01); *G06F 40/284* (2020.01); *G06Q 20/085* (2013.01); *H04L 63/1433* (2013.01)

(58) Field of Classification Search
USPC ......................................................... 726/25
See application file for complete search history.

(56) References Cited

U.S. PATENT DOCUMENTS

| | | | |
|---|---|---|---|
| 7,343,626 B1 * | 3/2008 | Gallagher ............. | G06F 21/577 707/999.003 |
| 2006/0047639 A1 * | 3/2006 | King ..................... | G06F 16/433 |
| 2008/0162329 A1 * | 7/2008 | Knapp ................... | G06Q 30/02 705/37 |
| 2009/0077383 A1 * | 3/2009 | de Monseignat ... | H04L 63/0823 713/175 |
| 2009/0158430 A1 | 6/2009 | Borders | |
| 2011/0283356 A1 | 11/2011 | Fly et al. | |
| 2013/0263272 A1 * | 10/2013 | Banerjee ............. | H04L 63/1483 726/25 |
| 2014/0129920 A1 * | 5/2014 | Sheretov ............. | H04L 63/0281 715/234 |
| 2015/0294000 A1 * | 10/2015 | Grant ..................... | G06Q 20/10 707/706 |

FOREIGN PATENT DOCUMENTS

| AU | 2018306445 A1 | 3/2020 |
|---|---|---|
| WO | WO-2020/034212 A1 | 2/2020 |

* cited by examiner

*Primary Examiner* — Eleni A Shiferaw
*Assistant Examiner* — Sakinah White Taylor
(74) *Attorney, Agent, or Firm* — Saliwanchik, Lloyd & Eisenschenk

(57) ABSTRACT

A method for detecting a web skimmer on a "Payment Page" relates to a network security, namely, a detection of a malicious code on web pages, which include fields for inputting a payment information and a user personal data, and it may be used to increase a security level in case of making online payments for goods and services. The claimed method checks elements, which are present on the web page, for a presence of the malicious code and determines an activity that is inherent to a web skimmer embedded on the web pages with a payment form, timely informs about a presence of the user characteristics and/or blocks the web page itself and provides security of the operations associated with payment of goods and services via the Internet.

7 Claims, 8 Drawing Sheets

METHOD FOR DETECTING A WEB SKIMMER ON A "PAYMENT PAGE"

CROSS-REFERENCE TO RELATED APPLICATION

This application claims priority to Ukrainian Application No. a202005348, filed Aug. 18, 2020, which is hereby incorporated by reference in its entirety.

FIELD OF THE INVENTION

The invention relates to a network security, namely to a detection of a malicious code on web pages, which comprise fields for inputting a payment information and a user personal data. The invention may be used to increase the security level in case of making online payments for goods and services.

TERMINOLOGY USED IN THE APPLICATION

Lexical analysis ("tokenization") is a process of analytic distribution of an input sequence of symbols into recognized groups being lexemes in order to obtain identified sequences, which are characterized as "tokens", on return.

Lexical analyzer (lexer or tokenizer) is a program or a program part that executes the lexical analysis. The lexical analyzer usually operates in two stages: scanning and evaluation.

Token is an object that is created from the lexeme in the process of the lexical analysis.

Document Object Model (DOM) is a cross-platform and language-independent interface that treats an XML or HTML document as a tree structure, wherein each node is an object that represents a part of the document. The DOM represents a document with a logical tree. Each branch of the tree ends in a node, and each node contains objects.

PRIOR ART

A method for detecting security threats within a computer network, the method comprising receiving a data stream that transmits outbound, application layer messages from a first computer process to at least one second computer process, if these computer processes are implemented on one or more computers; monitoring the data stream to detect a security threat based on a white list (the white list is a basic mechanism for access control that passes all elements: email address, passwords, URL-addresses, IP-addresses, domain names, file hashes and other ones comprised in this list, and has records, which comprise metadata, wherein the white list describes legitimate application layer messages based on a set of heuristic, and generating a signal if a security threat is detected) (US2009158430A1 dated Jun. 18, 2009). Also, a method for determining a combined trust level for a website, the method comprising: analyzing a user account associated with the creation or maintenance of the website, wherein the analysis of the user account is capable of identifying a presence or absence of a first risk factor affecting a likelihood that the user account is engaged in a malicious activity; analyzing a source code file capable of being used to create a message for sending to a remote computing device, the analysis of the source code file being capable of identifying a presence or absence of a second risk factor affecting a likelihood that the source code file is facilitating a malicious activity; based on the analysis of the user account and the analysis of the source code file, determining a combined trust level for the website, the combined trust level indicating a likelihood that the website is not engaged in a malicious activity (US2011283356A1 dated Nov. 17, 2011).

Also, a system for providing secure card data entry for a payment transaction, the system comprising: a card data collection device that includes a non-PCI-DSS validated payment application and a payment library, wherein the payment library includes an application program interface (API) through which the payment application interfaces with the payment library, and a PCI-DSS validated backend system that processes transactions from the payment library, wherein: the payment application is configured to make a first request to the payment library upon determining that sensitive data is required for the payment transaction; the payment library is configured to make a second request to the backend system upon receiving the first request from the payment application; the internal system is configured to return a secure card entry web page to the payment library in response to the second request, the secure card entry web page including fields for a user to enter sensitive data and further including a public encryption key for encrypting sensitive data entered by the user, the payment library is configured to cause rendering of the secure card entry web page on a graphical user interface of the card data collection device, receive encrypted sensitive data entered by the user via the secure card entry web page, and transmit a transaction request including the encrypted sensitive data to the backend system, and the internal system is configured to process the transaction request including decrypting the encrypted sensitive data using a private encryption key corresponding to the public encryption key (AU2018306445A1 dated Mar. 12, 2020).

Also, a method for detecting the security of a web page is known, the method comprising: sending a first test request and a second test request to the server of the web page to be tested, where the first test request includes a legal test request, and the second test request includes an illegal test request; receiving a first web response page corresponding to the first test request and a second web response page corresponding to the second test request; excluding the common part in each web response page, the common part in each web response page is a part that is not related to the SQL requests in the web page to be tested (WO2020034212A1 dated Feb. 20, 2020).

DRAWBACKS OF THE EXISTING SOLUTIONS DISCLOSED BY THE PRIOR ART

With the increase of the variety of Internet resources, particularly, with the appearance of a possibility of purchasing goods in Internet stores and paying for services via special sites, risks, which are associated with user personal data theft, are increased. Most frequently, a theft of a personal data is carried out by means of embedding malicious components into a code of a web page or into elements thereof. The embedding is performed by using a vulnerability of sites, CMS systems or plug-ins, which are used during development. As a result, malicious users embed the malicious JavaScript code into pages of the site, thereby obtaining a sort of a soft web skimmer. Such a soft performs a theft of bank cards numbers, user personal data (name, phone, email etc.). Therewith, during embedding of the malicious code into the web page or into elements thereof, the existing technical solutions notice an activity that is inherent to the web skimmer not in every instance due to the fact that they do not perform a complex check of all existing elements of the web page, rather they check one or more parameters, e.g., a presence of a malicious code and/or a substitution of input fields.

SUMMARY OF THE INVENTION

The claimed invention is based on a task to develop a method for detecting a malicious code with a possibility of its blockage on web pages "Payment page" (a web page with a payment form comprising fields for inputting a payment information, user personal data etc.), the method being intended to avoid theft of the information that is input to the fields of web-forms. In order to detect the malicious code, according to the method, all elements, which are present on the web page, are checked for a presence of the malicious code and an activity that is inherent to a web skimmer.

The set object is resolved as follows.

A method for detecting a web skimmer on a "Payment page" comprising:

Determining keywords, web page elements and its URL, which are inherent to the "Payment page", accessing a code of the web page.

Finding and obtaining a content of all scripts on the page, searching for a token, a series of similar combinations (types) of tokens having a maximum length. Each token has its own type, a table of the token types is used for determination of the type, the table being formed by means of a lexical analyzer, an operation principle of the lexical analyzer and formation of the tables of the token types are specified in the present description. A percentage of encoded or encrypted fragments of the script code relative to a number of the tokens in the script is determined. The encoded or encrypted fragment of the script code may comprise a fragment of the malicious code, this is a fragment of the code that is complicated for the analysis and has, e.g., names of functions and variables replaced with random ones. If the percentage of similar fragments of the code is more than 70%, a processing result will be accepted taking that the page comprises a script that is characterized as encoded or encrypted one.

Elements of fields of the form and buttons, which are present on the web page, and their duplicates are determined by means of analyzing the web page code, namely, a tag <input> that is intended to create text fields, buttons, switches etc., a type of the element is determined by means of an attribute "type", e.g.: <input type="file"> is applied to a field for sending a file. Elements of fields and buttons are detected using several event handlers on a specific element by means of checking elements and input fields of the current web page for a presence, in the web page code, of event handlers having specific attributes: onblur, onchange, oncontextmenu, onfocus, oninput, oninvalid, onreset, onsearch, onselect, onsubmit, onkeydown, onkeypress, onkeyup, onclick, ondblclick, onmousedown, onmousemove, onmouseout, onmouseover, onmouseup, onwheel, oncopy, oncut, onpaste.

Finding and obtaining a content of all scripts on the page, determining code fragments and tokens, which perform the check for a presence of a user on the web pages "Payment page", searching for predefined code fragments, which perform the check for a belonging of the current URL of the page to the "Payment page". The check of the current URL of the page for a presence of such keywords as "onepage", "checkout", "onestep", "payment" etc., is encoded in instances of the predefined code fragments. If such code fragments are found, this may be indicative of characteristics of a web skimmer, which often use such checks in order to execute the malicious code on specifically defined pages only, namely, on the "Payment page".

Tracking changes of a DOM on the web page by means of adding or altering the "src" attribute of the DOM objects <audio>, <embed>, <iframe>, <img>, <input>, <script>, <source>, <track>, <video>.

Checking a domain reference to a resource for belonging to payment systems. The check is performed using a preliminary compiled database (DB) that comprises data about payment systems, including a payment system domain. A presence of GET parameters in the URL is determined. A GET parameter is a dynamic parameter in the URL that enables transmission of data to a server by indicating the GET parameter in the URL-request as a value of the "src" attribute in one of the listed DOM objects. The GET parameter is visually outlined in the URL-address: arranged after a symbol "?" and parameters are divided by a symbol "&". The data of the GET parameters is compared with the data of the forms of the payment page, during the comparison process it is detected whether the data of the GET parameters in the URL-request match to the data of the form of the web page, a presence of matches is indicative of a presence of the malicious code or the web skimmer. Using the listed DOM objects, it is possible to make URL-requests to the server by altering or adding the "src", wherein the user data are transmitted to the server that does not belong to payment systems or the current site of the user. A presence of new elements over the current ones, cloning the current form or separate parts thereof, hiding or removing the elements of the current form, complete replacement of the current form, substitution of the page are detected. In order to detect changes of the current forms of the web page, the DOM document is analyzed and the activity that is inherent to the malicious code or the web skimmer is tracked.

Finding and obtaining the content of all the scripts on the page, analyzing the tokens and searching for the fragments of the code that performs the check for an activity of developer tools in a browser (Chrome DevTools, Firefox Developer Tools, Firebug etc.). The predefined code fragments have encoded therein the check of the current data of the web page for a presence of the corresponding data that is indicative that the developer tools are active in the browser at the present time. If such code fragments are found, this may be indicative of characteristics of the web skimmer, which often use such checks in order to terminate or complete stoppage of the operation of the web skimmer in order to avoid quick reveal of the presence of the web skimmer on the user page.

Blocking the page and/or sending a message about existence of risks to the user, if at least two discrepancies are present, namely, when properties, which are not inherent to the web pages "Payment page", are detected, such as a presence of the malicious code, replacement, substitution or complete change of the elements of the web page.

In one of embodiments of the method, a presence of the following keywords is indicated in the web page name as well as in the URL thereof: "onepage", "checkout", "onestep", "payment", and presence of elements of the input fields: card number, payment method, card expiration date, verification code (cvc, cvv, csc, cvd etc.), user name, user phone, country, city, delivery address, postal code. Based on the check, it is determined whether the web page relates to the Payment page being pages comprising a payment form.

According to further embodiment of the method, a lexical analyzer ("tokenization") is used for processing tokens for each of the scripts of the page.

According to further embodiment of the method, in order to track the activity being inherent to the web skimmer, changes of the DOM on the web page are tracked by means of adding or altering the "src" attribute of the DOM objects <audio>, <embed>, <iframe>, <img>, <input>, <script>, <source>, <track>, <video>. According to further embodiment of the method, the method is implemented at software level by means of a browser extension.

According to further embodiment of the method, if characteristics of the malicious code are present, the user will be automatically directed to a secure developer page with explanations as to why the page has been detected as a malicious one.

TECHNICAL EFFECT

The claimed method checks elements, which are present on the web page, for a presence of the malicious code and determines the activity that is inherent to the web skimmer that is embedded on the web pages with the payment form. It timely informs about presence of the user characteristics and/or blocks the web page itself and provides security of the operations associated with payment for goods and services via the Internet.

It must be appreciated that the presented general description and further detailed description is solely illustrative and explanatory, and does not limit the claimed invention.

DRAWINGS

FIG. 1 is a schematic diagram of the process for determining characteristics of a web page, which are inherent to "Payment page", FIG. 2 is a schematic diagram of the process for processing scripts and tokens on the web page, FIG. 3 is a schematic diagram of the process for detecting elements of fields and buttons using several event handlers on a specific element and their duplicates, FIG. 4 is a schematic diagram of the process for determining the code fragments of the web page, which are responsible for the check for the user presence on the "Payment page", FIG. 5 is a schematic diagram of the process for analyzing changes of the DOM on the web page and analyzing the use of the "src" attribute of the DOM objects.

DETAILED DESCRIPTION OF THE INVENTION

Figure 1:
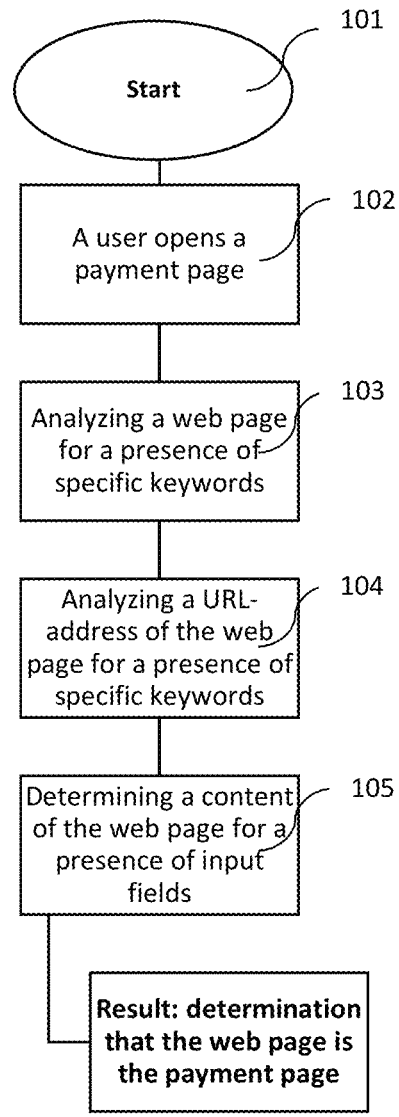

The method is implemented by means of a browser extension, said technical effect is achieved by the following sequence of actions (FIG. 1). User opens the browser, installs and turns on the extension (101). Upon entry to the payment page (102), the extension, according to indirect characteristics, performs the check of the "Payment page" for a presence of keywords (103): "onepage", "checkout", "onestep", "payment". The extension accesses the page content, analyses its content and tracks the correspondence with the page name according to specific keywords. According to results of the check, a presence of specific keywords (104) and specific input fields (105), such as card number, payment method, expiration date, cvc, cvv, csc, cvd etc., user name, user phone, country, city, delivery address, postal code, in the URL of the page is determined.

Figure 2:
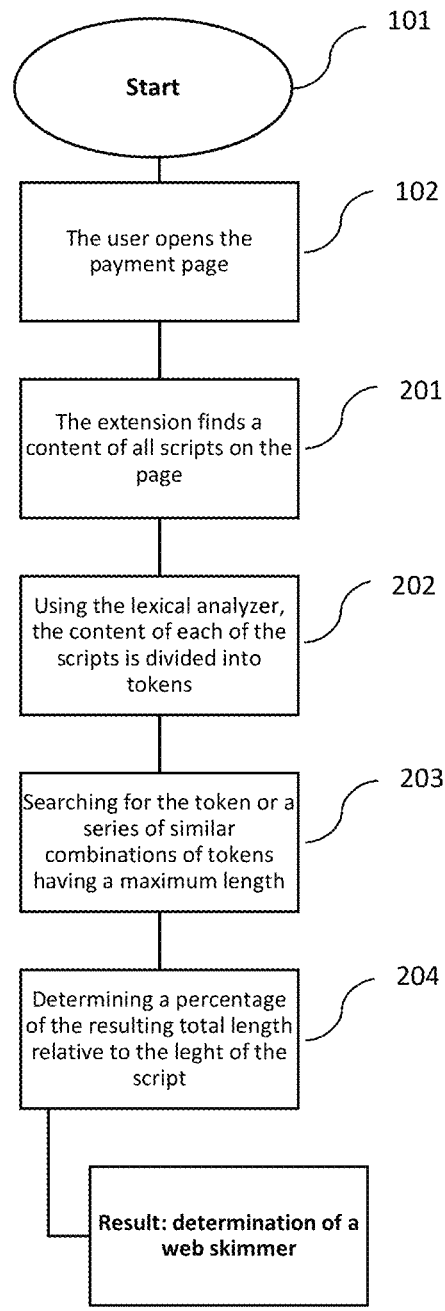

If the page is the payment page (FIG. 2), the extension determines the content of encoded and encrypted scripts on the page, finds the content of all the scripts on the page (201). By means of the lexical analyzer, the content of each of the scripts is divided into tokens (202). A token or a series of similar combinations (types) of tokens having a maximum length is searched (203). In order to perform calculation, a position of the beginning of the token and a position of its end are used and a total length of the token or series of the similar combinations (types) of the tokens is determined. A percentage of the resulting total length relative to the length of the scripts is determined (204), a ratio between the encrypted part of the scripts and the non-encrypted one is obtained. If the percentage ratio of the encrypted fragments of the code is more than 70% of the total number, a processing result will be indicative of the fact that the page comprises a script that bears characteristics of the encoded or the encrypted one.

Figure 3:
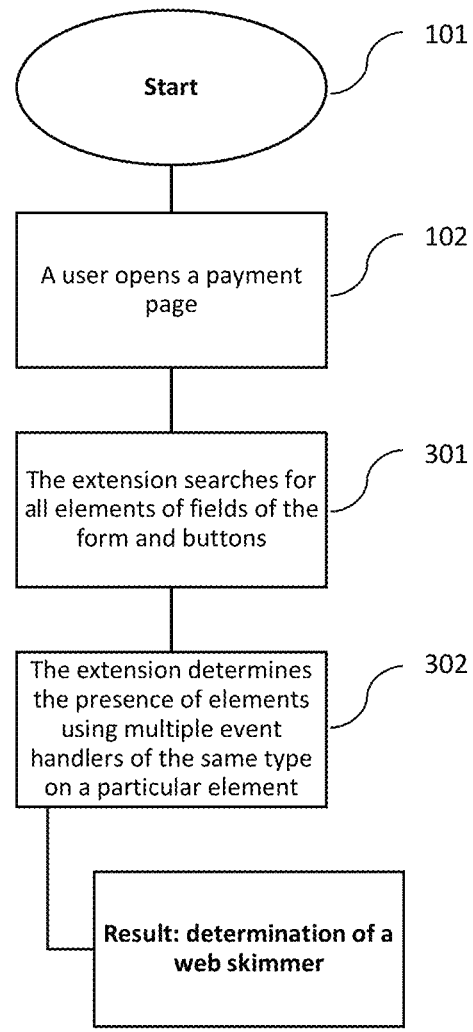

Then, a presence of the elements of the form with event handlers of the same type is determined (FIG. 3), which have keywords onblur, onchange, oncontextmenu, onfocus, oninput, oninvalid, onreset, onsearch, onselect, onsubmit, onkeydown, onkeypress, onkeyup, onclick, ondblclick, onmousedown, onmousemove, onmouseout, onmouseover, onmouseup, onwheel, oncopy, oncut, onpaste in the code of the web page. By analyzing the code of the page, the extension searches for all elements of the fields of the form and buttons (301) and determines a presence of the elements using several event handlers of the same type on the specific element (302) that may be indicative of the fact that the input fields or buttons, e.g., the button "send the form", have elements of the malicious code or the web skimmer embedded therein.

Figure 4:
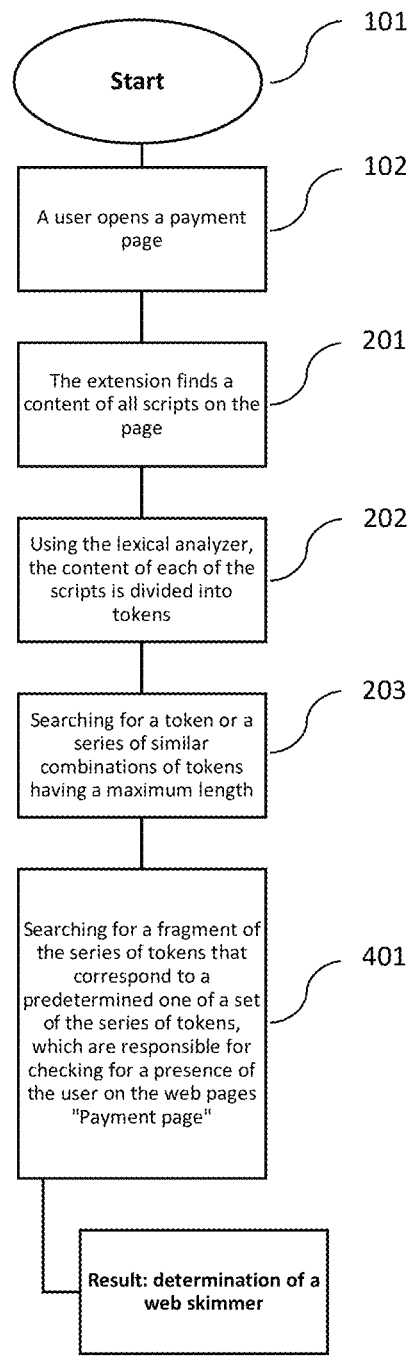

The presence of the code fragments, which are responsible for the check of the user presence on the "Payment page", is determined (FIG. 4) (401). The URL of the page is checked for the presence of such keywords as "onepage", "checkout", "onestep", "payment". If such code fragments are found, this may indicative of characteristics of the web skimmer, which often use such checks in order to execute the malicious code on specifically defined pages only, namely, on the "Payment page". The check may be performed by means of comparison of the keywords with a preliminary formed database of keywords.

Figure 5:
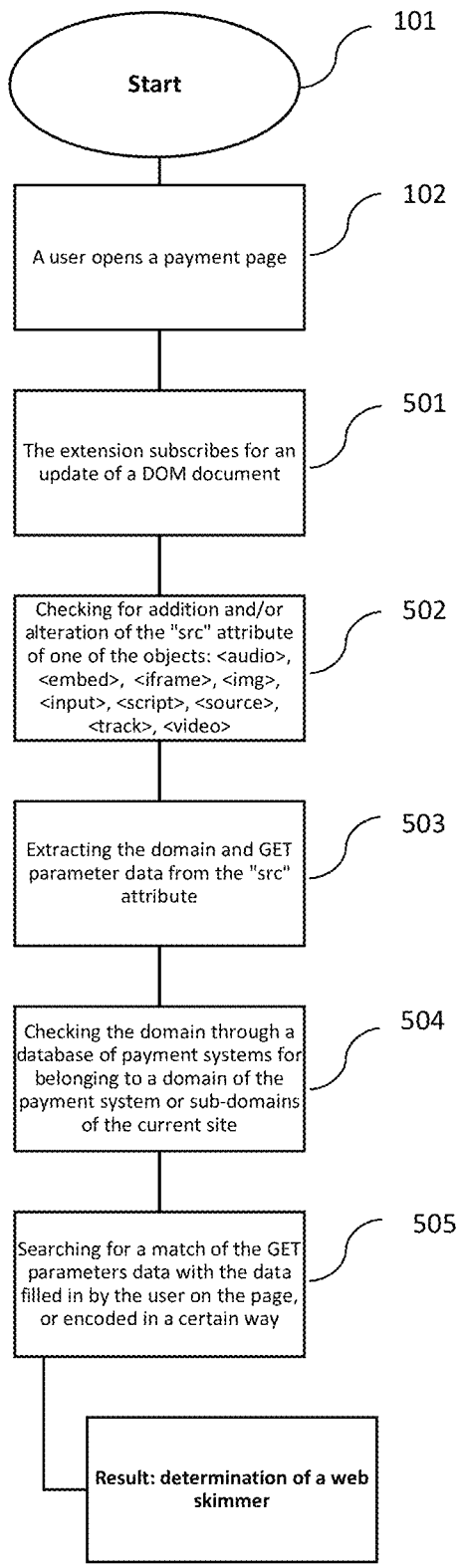

The extension finds the content of all the scripts on the page and, using the lexical analyzer, divides the content of each of the scripts into tokens (FIG. 5). It searches for the fragment of the series of tokens, which correspond to the predetermined one of a set of tokens, and sends the user data by means of the DOM elements. The extension subscribes for an update of the DOM document (501), thereby fixing addition, alteration of the "src" attribute in one of the objects (502). The activity of the objects <audio>, <embed>, <iframe>, <img>, <input>, <script>, <source>, <track>, <video> on the web page is tracked and they are analyzed for addition of malicious elements, which are inherent to the web skimmer, to the objects. If during sending the data by the user an additional processing thereof is performed, it will indicate that the code of the web page has malicious elements. The extension checks the domain and the data of the GET parameters from the "src" attribute (503), checks the domain through a base of the payment systems for belonging of the domain to the payment system or sub-domains of the current site (504). The check is performed using a preliminary compiled database (DB) that comprises data about payment systems, including the payment system domain. It determines a match between the data of the GET parameters and the data input by the user on the page or encoded in a certain way (505). In the process of comparison, it is detected whether the data of the GET parameters in the URL-request matches with the data of the form of the web page. Occurrence of matches is indicative of a presence of the malicious code or web skimmer. Also, if the domain does not meet characteristics, which are inherent to domains of the payment systems, the extension will block the site or alert the user about it.

Figure 6:
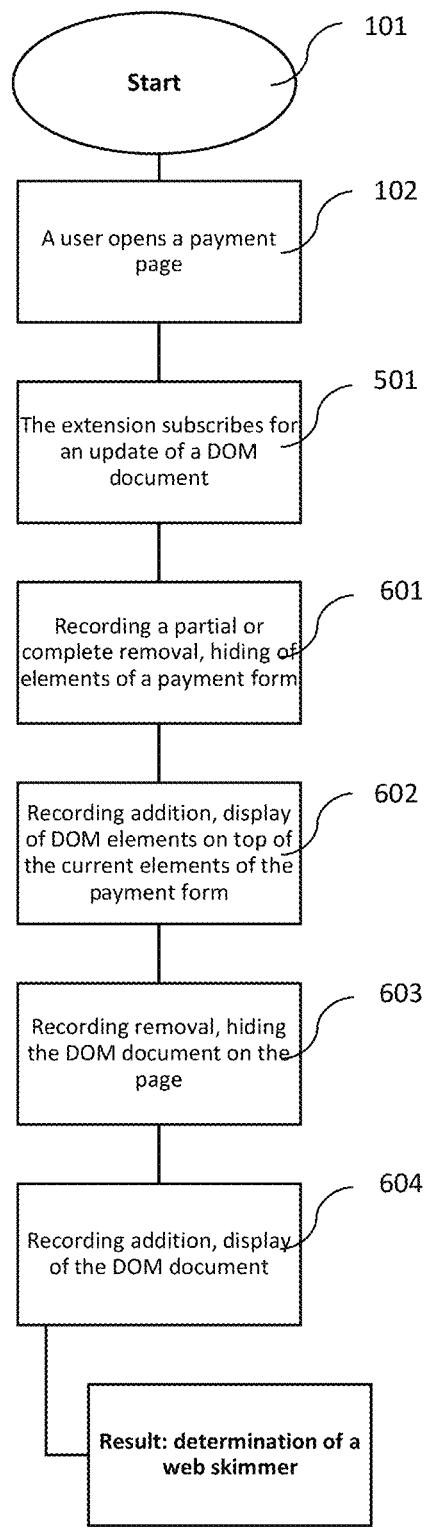
FIG. 6 is a schematic diagram of the process for detecting and adding new (malicious) elements on the web page.

The following is tracked: addition, cloning, substitution, hiding, removal, display on top of the elements of the current payment form and complete substitution of the complete "Payment page" (FIG. 6). Detection of said characteristics is indicative of a presence of the malicious code or activity that is inherent to the web skimmers. The extension subscribes for an update of the DOM document and tracks a partial or full removal, hiding of the elements of the payment form (601). The following is recorded: addition, display of the DOM elements on top of the current elements of the payment form (602), hiding the DOM document on the page (603), addition, display of the DOM document (604), which is also indicative of a presence of the malicious elements on the web page.

Figure 7:
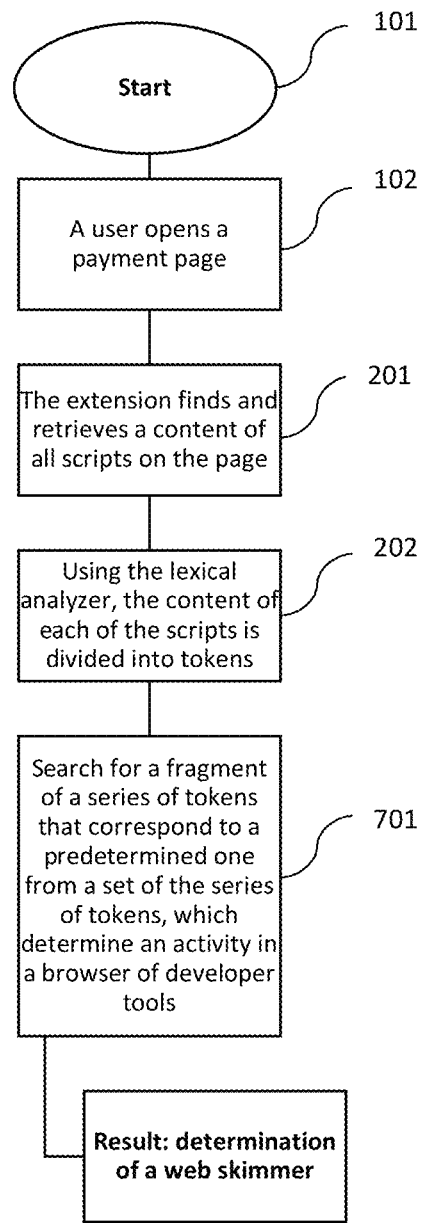
FIG. 7 is a schematic diagram of the process for checking the activity of the developer tools in the browser.

It is checked whether fragments of the code that is responsible for the check of the activity of the developer tools is present on the user page (FIG. 7) (701). The predefined code fragments have embedded therein the check of the current data of the web page for a presence of the corresponding data that is indicative that the developer tools are active in the browser at the present time. If such code fragments are found, this may be indicative of characteristics of the web skimmer, which often use such checks in order to terminate or complete stoppage of the operation of the web skimmer in order to avoid quick reveal of the presence of the web skimmer on the user page.

Figure 8:
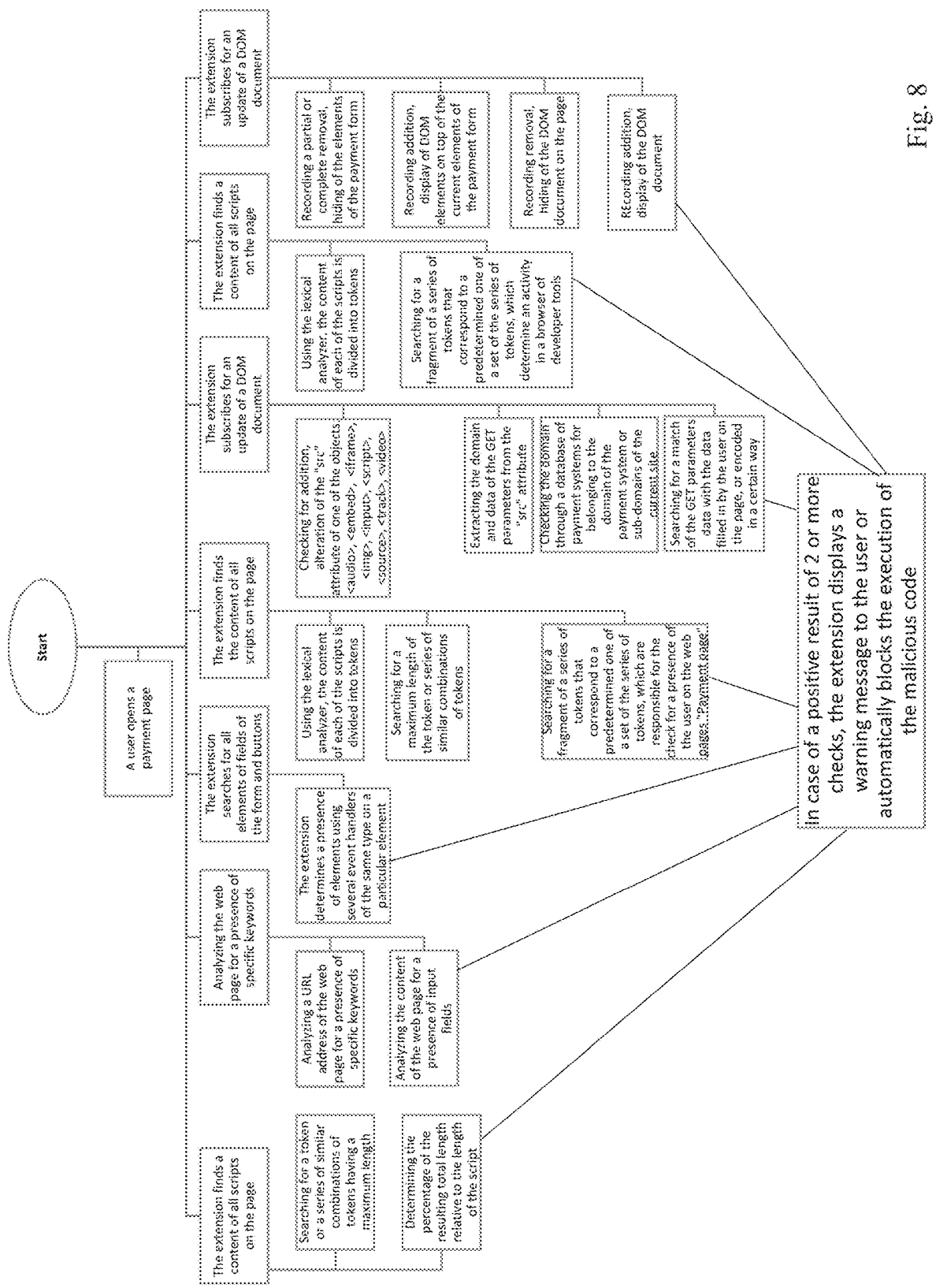
FIG. 8 is a common schematic diagram of the process for detecting the web skimmer on the "Payment page".

The general diagram of implementation of all check steps is depicted in the FIG. 8.

All visible elements, which are present on the web page, as well as HTML-code of the page are checked. In case of duplicates, several event handlers on the specific element, new elements on top of the current ones, cloning of the current form or its separate parts, hiding or removal of the elements of the current form, complete replacement of the current form, substitution of the page is present, the user will receive a warning message and/or the page will be automatically blocked.

Operation Principle of the Lexical Analyzer

The operation of the lexical analyzer consists of two steps: scanning and evaluation.

As for the scanning, the lexical analyzer is usually implemented in the form of a finite machine. The finite machine comprises an encoded information that is defined by regular expressions about all possible sequences of symbols, which could be met in the tokens, during the processing (separate instances of these sequences of symbols are referred to as lexemes). Therefore, the finite machine analyzes the data according to the presupposed expressions and transmits a result to an evaluator. An integer-valued lexeme may comprise any sequence of numeric symbols, in the most cases, a non-blank symbol may be used to define a current type of the token, subsequent input symbols are processed one-by-one up to reaching a symbol that is not comprised in the set of symbols accepted for this token.

As for the evaluation, the evaluator sorts the symbols of the lexeme to obtain values: a type of the lexeme in combination with its value to obtain a final result. In practice, there may be situations, when certain lexemes do not have values (e.g., a bracket is used). In this case, the evaluation may return nothing in the form of the value for them, only the type is used.

Example of the lexical analyzer operation in order to obtain a set of tokens:

let number=10;

The obtained result is mentioned in the table.

TABLE

| Type | Value |
|---|---|
| Keyword | Let |
| Identifier | Number |
| Punctuator | = |
| Numeric | 10 |
| Punctuator | ; |

Example of the Method Implementation

Example No. 1. The user goes to the payment page for an order in an Internet store. The browser extension determines whether the page, which is viewed by the user, belongs to the "Payment page". It is performed by checking the page for a presence of the keywords such as "onepage", "checkout", "onestep", "payment". Also, a presence of specific keywords and specific input fields, such as card number, payment method, expiration date, cvc, cvv, csc, cvd etc., user name, user phone, country, city, delivery address, postal code, in the URL of the page is determined. It is determined, according to the above-mentioned characteristics, that the page is the payment page, the extension finds the content of all the scripts on the page and determines a content of the encoded or encrypted scripts on the page in order to determine a ratio of the encrypted part of the script. It is determined that the ratio of the encrypted part of the script is 30% and more of the content of each separate script on the page, the check indicates that there are no characteristics of the malicious code or web skimmer.

The extension determines a presence of elements of the form with the event handlers of the same type. The extension searches for all elements of the fields of the form and buttons and determines a presence of the elements using several event handlers of the same type on the specific element.

The extension has found the event handlers of the same type. A result of this step indicates that event handlers of the same type are present in the code of the web page, which have specific attributes: onblur, onchange, oncontextmenu, onfocus, oninput, oninvalid, onreset, onsearch, onselect, onsubmit, onkeydown, onkeypress, onkeyup, onclick, ondblclick, onmousedown, onmousemove, onmouseout, onmouseover, onmouseup, onwheel, oncopy, oncut, onpaste. This is indicative of a presence of the malicious code or activity that is inherent to the web skimmers.

The extension determines a presence of the code fragments, which are responsible for the check of the user presence on the "Payment page". At this step, it is checked whether such keywords as "onepage", "checkout", "onestep", "payment" are present in the code of the web page. Said keywords have not been not found, the characteristics of the malicious code or web skimmer are absent.

The extension subscribes for an update of the DOM document, thereby fixing addition, alteration of the "src" attribute in one of the objects. Alterations of the DOM on the web page by means of adding or altering the "src" attribute of the DOM objects <audio>, <embed>, <iframe>, <img>, <input>, <script>, <source>, <track>, <video>, are tracked. The extension has not recorded the addition of new objects. Results of the check are indicative of the absence of the malicious code or web skimmer.

The extension checks the domain and data of the GET parameters from the "src" attribute. It checks the domain through the base of payment systems for belonging of the domain to the payment system or sub-domains of the current site. Data about the domain are present in the database that comprises data about payment systems, characteristics of the malicious code or web skimmer are absent.

The extension determines a match between the data of the GET parameters and the data input by the user on the page or encoded in a certain way. The extension compares and detects whether the data of the GET parameters in the URL-request matches with the user data. No matches have been detected, characteristics of the malicious code or web skimmer are absent.

The following is tracked: addition, cloning, substitution, hiding, removal, display on top of the elements of the current payment form and complete substitution of the complete "Payment page". Said characteristics have not been detected by the extension. According to results of this check, the malicious code or activities, which are inherent to the web skimmers, are absent.

The extension tracks a partial or a complete removal, hiding of the elements of the payment form. It checks for the addition, display of the DOM elements on top of the current elements of the payment form, removal, hiding of the DOM document on the page, addition, display of the DOM document. Upon check at the present step, said characteristics have not been detected, the malicious code or web skimmer are absent.

It is checked whether fragments of the code that is responsible for the check of the activity of the developer tools is present on the user page. The instances of the predefined code fragments have encoded therein the check of the current code data of the web page for a presence of the corresponding data that is indicative that the developer tools are active in the browser at the present time. Such code fragments are indicative of characteristics of the web skimmer, which often use such checks in order to terminate or complete stoppage of the operation of the web skimmer in order to avoid quick reveal of the presence of the web skimmer on the user page. Such code fragments have not been found in the process of the check, the characteristics of the malicious code or web skimmer are absent.

According to the results of the successive check of all the parameters of the web page, one characteristic of the malicious code or web skimmer has been found, namely, event handlers of the same type. In view of the fact that only one characteristic of the malicious code has been found during complete implementation of the method, the check is considered as being successfully conducted. The payment operation may be completed.

Example No. 2. The user goes to the payment page for an order in an Internet store. The browser extension determines whether the page, which the user is present on, belongs to the "Payment page". It is performed by checking the page for a presence of the keywords such as "onepage", "checkout", "onestep", "payment". Also, a presence of specific keywords and specific input fields, such as card number, payment method, expiration date, cvc, cvv, csc, cvd etc., user name, user phone, country, city, delivery address, postal code, in the URL of the page is determined. If it is determined, according to the above-mentioned characteristics, that the page is the payment page, the extension will find the content of all the scripts on the page and determines a content of the encoded or encrypted scripts on the page in order to determine a ratio of the encrypted part of the script. It is determined that the ratio of the encrypted part of the script is more than 70% of the content of each separate script on the page, which is indicative of the characteristics of the malicious code or web skimmer.

The extension determines a presence of elements of the form with the event handlers of the same type. The extension searches for all elements of the fields of the form and buttons and determines a presence of the elements using several event handlers of the same type on the specific element. If no event handlers of the same type have been found, the result of the present step of the check indicates that the characteristics of the malicious code or web skimmer are absent.

The extension determines a presence of the code fragments, which are responsible for the check of the user presence on the "Payment page". At this step, it is checked whether such keywords as "onepage", "checkout", "onestep", "payment" are present in the code of the web page. Said keywords have not been not found, the characteristics of the malicious code or web skimmer are absent.

The extension subscribes for an update of the DOM document, thereby fixing addition, alteration of the "src" attribute in one of the objects. The activity of the objects <audio>, <embed>, <iframe>, <img>, <input>, <script>, <source>, <track>, <video> on the web page is tracked and they are analyzed for addition of malicious elements, which are inherent to the web skimmer, to the objects. The extension has recorded the addition of new objects. Results of the check are indicative of the presence of the malicious code or web skimmer.

The extension checks the domain and data of the GET parameters from the "src" attribute. It checks the domain through the base of payment systems for belonging of the domain to the payment system or sub-domains of the current site. Data about the domain are present in the database that comprises data about payment systems, characteristics of the malicious code or web skimmer are absent.

The extension determines a match between the data of the GET parameters and the data input by the user on the page or encoded in a certain way. The extension compares and detects whether the data of the GET parameters in the URL-request matches with the user data. No matches have been detected, characteristics of the malicious code or web skimmer are absent.

The following is tracked: addition, cloning, substitution, hiding, removal, display on top of the elements of the current payment form and complete substitution of the complete "Payment page". Said characteristics have not been detected by the extension. According to results of this check, the malicious code or activities, which are inherent to the web skimmers, are absent.

The extension tracks a partial or a complete removal, hiding of the elements of the payment form. It checks for the addition, display of the DOM elements on top of the current elements of the payment form, removal, hiding of the DOM document on the page, addition, display of the DOM document. Upon check at the present step, said characteristics have not been detected, the malicious code or web skimmer are absent.

It is checked whether fragments of the code that is responsible for the check of the activity of the developer tools is present on the user page. The instances of the predefined code fragments have encoded therein the check of the current data of the web page for a presence of the corresponding data that is indicative that the developer tools are active in the browser at the present time. Such code fragments are indicative of characteristics of the web skimmer, which often use such checks in order to terminate or complete stoppage of the operation of the web skimmer in order to avoid quick reveal of the presence of the web skimmer on the user page. Such code fragments have not been found in the process of the check, the characteristics of the malicious code or web skimmer are absent.

According to the results of the check of all the parameters of the web page, two characteristics of the presence of the malicious code or web skimmer have been found, namely: the ratio of the encrypted part of the script is more than 70% of the content of all scripts on the page and the addition or alteration of the "src" DOM attribute in one of the objects has been recorded, such as: <audio>, <embed>, <iframe>, <img>, <input>, <script>, <source>, <track>, <video>. The user will be automatically forwarded to a secure developer page (a warning page), which will display a message that the user data may be thieved and provide a detailed explanation as to why the page viewed by the user was detected as malicious one or the payments from the site with the malicious code will be automatically blocked by the browser extension.

The invention claimed is:

1. A method for detecting a web skimmer on a "Payment page", the method comprising:
    determining keywords, web page elements and its URL, which are inherent to the "Payment page", and accessing a code of the web page;
    finding and obtaining a content of all scripts on the page, searching for a token having a series of similar types of tokens, determining a percentage ratio between the tokens in the script and encoded or encrypted fragments of the script code;
    determining elements of fields of the form and buttons, detecting elements of fields and buttons using several event handlers on a specific element and their duplicates;
    finding and obtaining the content of all scripts on the page, determining code fragments and tokens, which check for the user presence on the web pages "Payment page";
    tracking changes of a DOM on the web page by using a "src" attribute of the Document Object Model (DOM) objects, checking a domain reference to a resource for belonging to payment systems, determining a presence of GET parameters in the URL, comparing the GET parameters with data of the forms of the payment page, detecting a presence of new elements on top of the current ones, cloning of the current form or its separate parts, hiding or removal of the elements of the current form, complete replacement of the current form, substitution of the page;
    finding and obtaining the content of all the scripts on the page, analyzing the tokens and searching for the code fragments, which perform the check for an activity of developer tools in a browser (Chrome DevTools, Firefox Developer Tools, or Firebug etc.); and
    blocking malicious code and/or sending a message about existence of risks to the user, if at least two discrepancies are present.

2. The method according to claim 1, characterized in that a presence of the following keywords is determined in the web page name, as well as its URL: "onepage", "checkout", "onestep", or "payments".

3. The method according to claim 1, characterized in that a presence of the following input fields elements is determined on the web page: card number, payment method, card expiration date, verification code (cvc, cvv, csc, cvd, etc.), user name, user phone, country, city, delivery address, or postal code.

4. The method according to claim 1, characterized in that a lexical analyzer ("tokenization") is used for processing tokens for each of scripts of the page.

5. The method according to claim 1, characterized in that alterations of the DOM on the web page by means of adding or altering the "src" attribute of the DOM objects <audio>, <embed>, <iframe>, <img>, <input>, <script>, <source>, <track>, or <video>, are tracked.

6. The method according to claim 1, characterized in that the method is implemented at a software level by means of a browser extension.

7. The method according to claim 1, characterized in that, if characteristics of the malicious code are present, the user will be automatically directed to a secure developer page with explanations as to why the page has been detected as a malicious one.

* * * * *